United States Patent
Parry

(10) Patent No.: US 7,239,409 B2
(45) Date of Patent: Jul. 3, 2007

(54) REMOTE ACCESS TO PRINT JOB RETENTION

(75) Inventor: Travis J. Parry, Boise, ID (US)

(73) Assignee: Hewlett-Packard Development Company, L.P., Houston, TX (US)

(*) Notice: Subject to any disclaimer, the term of this patent is extended or adjusted under 35 U.S.C. 154(b) by 920 days.

(21) Appl. No.: 09/887,618

(22) Filed: Jun. 22, 2001

(65) Prior Publication Data

US 2002/0196460 A1 Dec. 26, 2002

(51) Int. Cl.
*G03G 15/00* (2006.01)

(52) U.S. Cl. .................. 358/1.15; 358/1.13; 399/9; 399/81; 707/10; 709/218; 709/219; 715/733; 715/740

(58) Field of Classification Search ............... 358/1.13, 358/1.15; 399/8, 81; 707/10; 709/218, 709/219; 715/733, 740
See application file for complete search history.

(56) References Cited

U.S. PATENT DOCUMENTS

| | | | |
|---|---|---|---|
| 5,467,434 A | 11/1995 | Hower, Jr. et al. | 358/1.15 |
| 5,638,498 A * | 6/1997 | Tyler et al. | 358/1.18 |
| 5,715,381 A | 2/1998 | Hamilton | 358/1.15 |
| 5,781,711 A | 7/1998 | Austin et al. | 358/1.15 |
| 5,832,191 A | 11/1998 | Thorne | 358/1.15 |
| 5,838,906 A | 11/1998 | Doyle et al. | 709/202 |
| 5,949,438 A | 9/1999 | Cyman et al. | 345/502 |
| 5,951,636 A | 9/1999 | Zerber | 709/202 |
| 5,956,487 A | 9/1999 | Venkatraman et al. | |
| 6,052,198 A | 4/2000 | Neuhard et al. | 358/1.15 |
| 6,091,507 A | 7/2000 | Vatland et al. | 358/1.15 |
| 6,160,629 A | 12/2000 | Tang et al. | 358/1.1 |
| 6,184,996 B1 | 2/2001 | Gase | |
| 6,453,127 B2 * | 9/2002 | Wood et al. | 399/8 |
| 6,738,841 B1 * | 5/2004 | Wolff | 710/62 |
| 2002/0036793 A1 | 3/2002 | Roosen et al. | |
| 2002/0116291 A1 | 8/2002 | Grasso et al. | |

* cited by examiner

*Primary Examiner*—Aung S. Moe
*Assistant Examiner*—Peter K Huntsinger

(57) ABSTRACT

The present invention provides methods and apparatus for remotely managing and accessing print jobs stored in job retention of a printing device, including displaying, printing, canceling, prioritizing, and otherwise controlling various aspects of the print jobs and/or the print queue. In a preferred embodiment, the present invention makes use of a Java-enabled Web browser on a workstation, a java applet accessible by the Web browser, and an embedded Web server incorporated in a printing device to provide the management and access functions. Rasterized images of the print jobs may also be viewed by using the applet file viewer.

20 Claims, 7 Drawing Sheets

REMOTE ACCESS TO PRINT JOB RETENTION

FIELD OF THE INVENTION

The present invention relates generally to printers and methods of managing print jobs stored in printer memory. More specifically, the present invention relates to access and control of stored print jobs and print functions over a network and access and control of stored prior jobs by a remotely situated user.

BACKGROUND OF THE INVENTION

Printer technology has made rapid advances over recent years. Still, employing and controlling print services over a network may often be a cumbersome and difficult task.

In a typical printing process over a network environment, a user at a computer workstation typically uses print driver software to load documents or images into a buffer (usually an area on a disk of a workstation), where a printer pulls them off the buffer at its own rate. The user may also use the print driver software to manually adjust the print attributes, which instruct the printer on the proper processing of the document or image files. Print attributes typically include image options (e.g., resolution, background), image orientation (landscape, portrait, etc.), number of copies, colors, duplex (double-sided) or single-sided printing, and other printing parameters. The print driver also functions to convert the text, graphics and print attributes specified by the user's workstation into a set of codes that the printer can translate and/or read. The set of codes is typically a version of Printer Control Language (PCL), developed by Hewlett-Packard for its dot-matrix, inkjet, and LaserJet series printers. The version of PCL most commonly used as the printer coding language is Page Description Language (PDL). Once the text, graphics and print attributes have been converted to PDL, the PDL is transmitted by the workstation over the network where it is received by the printer as a "print job." Examples of PDL's include Hewlett Packard's HP-GL/2 language and Adobe's PostScript®.

To assemble the print job, most workstations incorporate driver software that displays a graphical user interface (GUI). By using a mouse to "point and click," and/or by keyboard entry, etc., the user selects the print attributes from a menu of options displayed in the GUI, thereby setting the components and print attributes to be used for the print job.

A network printer, however, can print only one job at a time, yet must be available at all times to multiple users. For this reason, local network architectures will typically incorporate a dedicated print server, also known as a print spooler. A print spooler is a device that accepts requests for printer resources, and then allocates the use of printer resource according to a set of specified rules. When a print spooler is present, users can send their data (e.g., PDL files) through the print spooler rather than directly to the printer. Upon receiving data destined for one or more printers, the print spooler writes this data into a temporary file instead of sending it immediately to a printer. For example, when multiple users initiate commands on their respective workstations to print a number of documents, the print spooler queues the documents by placing them in an interim holding area called a print buffer or print queue. The printer then pulls the documents off the queue one at a time. Later, when the printer becomes available, the print spooler will write the data to the printer.

As the printer receives the coded language from the printer driver, it stores the information in high capacity memory storage (job retention), which typically comprises random-access memory (RAM) or a hard disk. A stored print job thus comprises one or more electronically stored files and the print attributes associated therewith. Before a typical print job (e.g., a PDL file) can be printed, however, its contents must be converted to a bit-mapped image format, also known as a raster image. The raster image is a bit-mapped representation of the document to be printed, with each bit in the bitmap representing the absence or presence of a dot (or pixel) on the printed page. A raster image processor ("RIP") in the printer typically translates PDL files to a raster image, also called a "RIP'ed" version of the file. Thus, the print files include data representing graphical images and the RIP'ed version is generated from the print file. Typically, print jobs are RIP'ed before storage in job retention, making them "print ready files." In some cases, print jobs are received by the printer in the form of raster image data. In that case, a processor in the printer may engage in pixel image manipulation when storing the print job.

Once the print job has been stored in print job retention, a user may check on the status of a print job and the owner of a document using, for example, a graphical user interface (e.g., a "printer window"). The user's ability to manage the stored jobs, however, is presently quite limited. For example, a typical printer window allows a user to locate printing information (such as the status of print jobs and the owner of a document), to cancel or pause the printing of any unprocessed documents the user has sent, and possibly to "promote" the user's document in priority in the print queue of the printer.

Thus, there is presently little a user can do to access the stored print job and/or alter the print attributes thereof using conventional software and system components. Consequently, a user that does not remember what has been stored in job retention may not be able to access the stored job to view its contents. Furthermore, many of today's printers allow print jobs to be stored permanently on a printer's hard disk for frequent, on-demand printing, such as in the case of repeatedly generated forms and other graphically intense documents. Once those print jobs have been processed and stored in printer memory, users are typically unable to manage or control any aspects of those jobs. Therefore, a need exists in the art for convenient methods and associated apparatus allowing increased control over print jobs which are pending and which have been processed and stored by a printer.

SUMMARY OF THE INVENTION

The present invention provides methods of using an embedded Web server on a printing device in conjunction with at least one networked workstation to manage printing jobs stored in a printer-associated cache (job retention) for later printing and/or access. Generally, the methods of the present invention comprise providing a printer incorporating an embedded web server linked to a network, storing data to be printed in the memory of the printer as a print job, accessing the embedded web server using a web browser on a remotely situated workstation linked to the network, and managing the print job through interaction of the remotely situated workstation and the embedded web server.

In a preferred embodiment of the invention, an embedded Web server on a printer generates a Web page which may be accessed by a conventional Java-enabled Web browser on a workstation of a user. The Web page contains an embedded <APPLET> tag associated with an interactive Java application configured for accessing and managing print jobs stored in job retention of the printer. The Java application, or applet, will typically be stored in the hard disk of the printer, but may alternatively be stored on the user's workstation, a printer server, and the like. Upon specifying the URL of an appropriate HTML page generated by the embedded Web server, the applet's code is transferred to user's workstation and executed by the Web browser's Java Virtual Machine (JVM). The applet code runs within the Web browser and is configured to provide the user with a plurality of interface options for accessing and managing print jobs stored in print job retention on the printer, including displaying, printing, canceling, prioritizing, and otherwise controlling various aspects of the print jobs and/or the print queue. Rasterized images of the print jobs may also be viewed using the applet as a file viewer.

The present invention also comprises a system for managing print jobs stored in job retention of a printing device. The system uses a printing device having an embedded Web server and job retention memory configured for storing print jobs sent by network-based devices. The printing device is in mutual communication with a workstation configured with a Web browser. The system further includes an applet accessible by the workstation which is configured for management of stored data in the job retention memory of the printing device through user input on the workstation. Preferably, the Web browser is Java-enabled and a Java Virtual Machine platform is provided on the workstation. According to aspects of the invention, the applet is threaded so as to operate the Web server.

In another embodiment of the invention, a user may convert the rasterized image of a stored print job into printer control language by interaction of the embedded Web server, the applet, and the user's Web browser.

BRIEF DESCRIPTION OF THE SEVERAL VIEWS OF THE DRAWINGS

In the drawings, which illustrate what is currently considered to be the best mode for carrying out the invention.

DETAILED DESCRIPTION OF THE INVENTION

Figure 1:
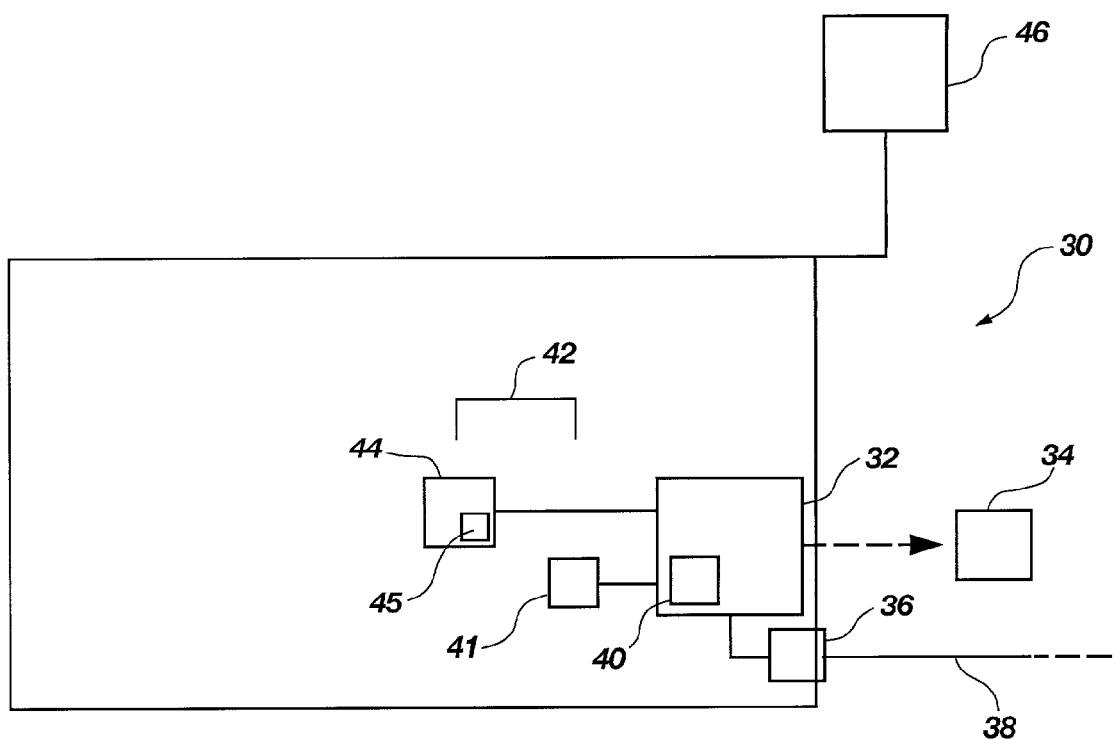
FIG. 1 is a block diagram of a printing device configured with an embedded Web server for use in the methods and system of the present invention.

The present invention provides methods and apparatus for remotely managing and accessing print jobs stored in job retention of a printer. In a preferred embodiment, the present invention makes use of a Java-enabled Web browser on a Web-based device, a java applet accessible by the Web browser, and an embedded Web server incorporated in a printing device to carry out the methods described herein.

Web browsers communicating across a network with remotely located Web servers are widely used to provide access to information stored on a responsive host system. Office intranets and the World Wide Web ("the Internet") are examples of some of the networks used in browser-to-server communications. Typically, browser-to-server communications occur using an internet communication protocol referred to as Hyper Text Transfer Protocol (HTTP). HTTP defines how messages are formatted and transmitted on the Web, and what actions Web servers and Web browsers should take in response to various commands. The information is commonly packaged as multiple web pages created using a hyper-text markup language (HTML). HTML is interpreted by a Web browser and dictates how Web pages are to be formatted and displayed on the Web browser to the user.

To access the Web, a user at a workstation typically activates a Web browser (a graphical user interface software application), which will usually be stored on the hard drive of a workstation. Well-known Web browsers include Netscape's Navigator® and Microsoft's Internet Explorer®. The activation of the Web browser on a workstation initiates a suitable network connection to an HTTP server and the Internet. In general, in order to connect to a desired website having retrievable information, a network address designated a Uniform Resource Locator (URL) is entered into the Web browser. The URL identifies both the location of the site and one or more pages of information contained at that site, which is supported by a particular Web server. At each URL, one or more Web pages of text, graphics, or other information is stored on Web Server in a predefined hierarchy.

Using a URL, the Web browser sends a command in the form of a retrieval request for the selected web page, which is then transmitted to the web server across the network. The Web server receives the request and then packages and transmits the Web page back to the Web browser for display to the user. Thus, for example, when a URL is entered into a Web browser, the Web browser sends an HTTP command to Web server directing Web server to fetch (download) and then transmit the requested data (Web page) identified by the URL.

A recently developed means for enhancing a Web page is through the use of executable software linked to the Web page. Typically, the executable software is downloaded along with the Web page in response to a Web browser's retrieval request. In this regard, references to the software are embedded on the Web page. The executable software is typically coded in Java programming language (first developed by Sun Microsystems) and is commonly referred to as an "applet." Upon identifying the software reference to the applet, the Web browser loads and executes the applet, the applet providing one or more programmed functionalities operating within the Web browser window.

Software within the Web browser translates the Java-based applets into bytecodes which are understood by the underlying operating system of the workstation, with the workstation's operating system providing machine-specific support for many of the actual operations and interactions programmed by the Java software. In this regard, conventional Web browsers commonly incorporate a Java interpretation program known as "Java Virtual Machine." Using Java Virtual Machine, the applets may be executed by computers using any of a variety of conventional operating systems, including Windows, UNIX, Macintosh, and the like.

Applets have been used, for example, to animate moving objects on the web page, and to fetch and play an audio clip. Applets can also be used to generate and display a separate window on top of a Web page in response to a mouse click inside the web page. In this regard, an applet-created window may, for example, independently operate within a web page to provide a menu bar across the top of the window and provide user options within that window.

Referring to drawing FIG. 1, a preferred printing device 30 for carrying out the methods of the present invention is shown. Printing device 30 is configured with both printer specific hardware and software and an embedded Web interfacing system (e.g., a Web server 32) for enabling access and interaction with other devices linked to local and external communication networks ("networks"), including the World Wide Web (the "Internet"), a local area network (LAN), a wide area network (WAN), an intranet, the computer network of an on-line service, etc. The printer specific hardware and software of printing device 30 may be provided in any conventional printer configuration known in the art, including those associated with laser printers, impact printers, photographic printers, and inkjet printers. Printing device 30 includes one or more local displays 46, which may comprise a conventional monitor, a monitor coupled with an integrated display, an integrated display (e.g., an LCD display), or other means for viewing print queues, print attributes, and associated data or processing information, including printer specific information. Printing device 30 also includes a network interface (I/O) 36 for bidirectional data communication through one or more and preferably all of the various networks (LAN, WAN, Internet, etc.) using communication paths or links known in the art, including wireless connections, ethernet, bus line, Fibre Channel, ATM, standard serial connections, and the like.

In a most preferred embodiment, the embedded Web interfacing system comprises a Web server 32 providing one or more Web server functions to requesting users linked by way of one or more of the various networks (LAN, WAN, Internet, etc.). The preferred printing device 30 of the present invention may thus be the same or conceptually similar to the printer apparatus configured with an embedded Web server described in U.S. Pat. No. 5,956,487 to Venkatraman et al., assigned to the assignee of the present invention, the disclosure of which is incorporated by reference herein in its entirety.

Still referring to drawing FIG. 1, the embedded Web server 32 of the present invention is preferably housed in printing device 30 on a single microprocessor board (not shown), which includes a microprocessor 40 responsible for controlling all aspects of Web server 32. Thus, microprocessor 40 is configured to process communication protocols and executable programs associated with Web server 32 which are stored in ROM (not shown) and/or hard disk memory 44. In a most preferred embodiment, Web server 32 uses microprocessor 40 and the ROM-stored protocols to exchange data with other devices/users on one or more of the networks via Hyper Text Transfer Protocol (HTTP) and Simple Mail Transfer Protocol (SMTP), although other protocols such as File Transfer Protocol (FTP), Simple Network Management Protocol (SNMP), and Gopher document protocol may also be supported. Web server 32 is further configured to send and receive HTML formatted files.

Microprocessor 40 is preferably part of the existing circuitry associated with a conventional printer. As such, microprocessor 40 is preferably configured to perform some or all of the printer specific functions of printing device 30, including control of printer specific hardware and software.

Microprocessor 40 is provided with memory 42 in the form of RAM 41 and/or hard disk memory 44, which may be associated with the print cache of printing device 30, or which may be provided separately from the print cache. As used herein, printer memory designated for temporarily or permanently storing one or more print jobs on hard disk memory 44 or other data storage device in printing device 30 is referred to as "job retention" 45. In one embodiment, a percentage of memory 42 in printing device 30 may be dedicated to Web server 32. Alternatively, Web server 32 may share the available memory 42 in printing device 30 with the print cache. Typically, printing device 30 will be equipped with a minimum of 64 megabytes of RAM 41, although less RAM may be used in certain configurations.

Preferably, microprocessor 40 of printing device 30 is configured to translate coded language received from printer drivers of networked workstations into a bit-mapped image format (raster image format), and to store the translated print files in high capacity memory storage (i.e., job retention 45). Thus, the resulting "RIP'ed" print jobs, representing graphical images of text or drawings along with associated print attributes, are stored in job retention 45 as "print ready files."

Printing device 30 will preferably contain executable software programs stored on hard disk 44 related to the operation of Web server 32. Hard disk 44 may also contain printer specific software programs relating to the operation of printer specific hardware. Alternatively, a separate hard disk (not shown) may optionally be provided with the requisite software programs for printing.

Using microprocessor 40, associated software, and internal circuitry of printing device 30, Web server 32 supports one or more control operations that relate to the function of printing device 30. Preferably, Web server 32 is configured to support the complete set of printing operations of printing device 30, including access, control, and operation of printing device job retention 45.

In accordance with the present invention, hard disk memory 44 or ROM contains at least one directory in memory 42 which stores at least one interactive Java application configured for accessing and managing print jobs stored in job retention of printing device 30. The at least one interactive Java application may also, or alternatively, be stored in a directory associated with separate memory dedicated to Web server 32. The at least one interactive Java application may comprise compressed or uncompressed files in memory 42 of printing device 30. The preferred functions of the at least one interactive Java application are described in more detail below.

In addition to being linked to a local area network (LAN) or wide area network (WAN), printing device 30 is preferably linked directly to the Internet via network interface 36 and communication links 38 attached thereto. Embedded Web server 32 within printing device 30 is provided with at least one Uniform Resource Locator (URL), by which it is identified over a network, and which can be accessed via HTTP, for example, from a remotely located workstation over a LAN, WAN, or over the Internet. Additional URLs may be provided for components of printing device 30 that have differing functions. For example, a URL may be provided for a component of printing device 30 which is capable of performing facsimile functions.

Embedded Web server 32 preferably generates at least one web page (HTML page) that provides an interface for printing device 30 that can be accessed by a remote workstation or other internet-based device via a browser client provided with the appropriate URL address. Embedded Web server 32 may also post an interactive web page to the control panel of printing device 30 using, for example, Java "Swing" controls. Of the Web pages stored in memory associated with Web server 32, at least one Web page 34 contains an embedded <APPLET> tag associated with at least one interactive Java application configured for accessing and managing print jobs stored in job retention of the printer.

Using microprocessor 40, associated software, and internal circuitry of printing device 30, embedded Web server 32 also supports one or more control operations that relate the function of printing device 30 and is preferably configured to support the complete set of printer operations of printing device 30, to include: decoding transmitted information to be printed (e.g., RIP'ing print files in PDL), storing print jobs in job retention 45, printing from job retention 45, querying the status of print jobs stored or previously stored in job retention 45, converting RIP'ed files back into PDL, and retrieving print jobs from job retention 45 for display on a Web page of embedded Web server 32. Embedded Web server 32 is also preferably configured to extract various data stored in job retention 45 and to transmit that data on demand to an authorized requesting Web-based device.

Figure 2:
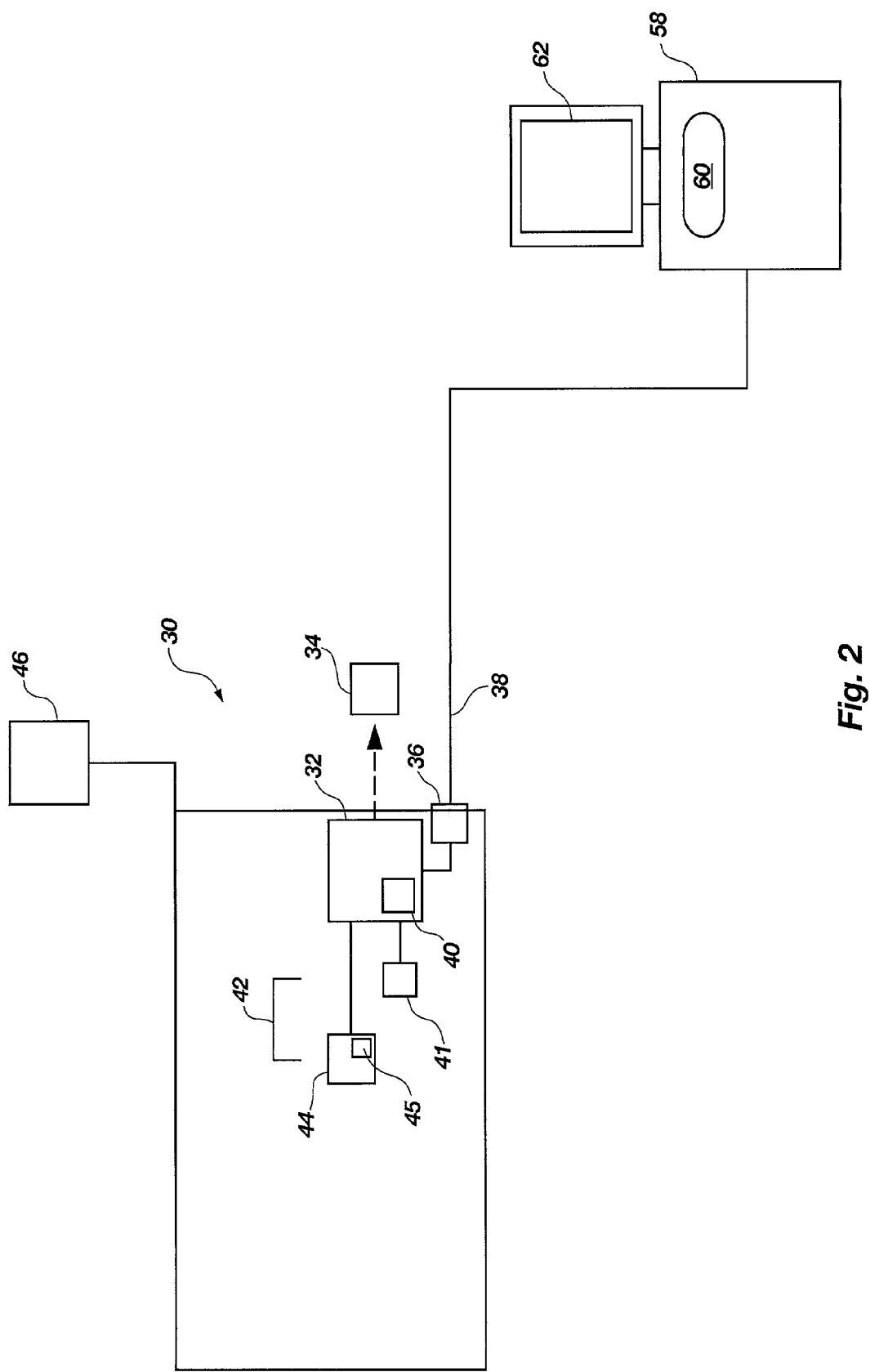
FIG. 2 illustrates a system of network components used in the methods and system of the present invention.

Referring now to drawing FIG. 2, a workstation 58 configured in accordance with the aims of the present invention is shown connected to printing device 30 through a communication link 38, which may include, for example, one or more of an internet connection, a wireless connection, LAN (e.g., ethernet, token ring, etc.), WAN, bus line, Fibre Channel, ATM, or a direct connection using a parallel or serial cable. Workstation 58 will preferably be conventionally configured, and thus have a display, microprocessor, RAM, ROM, hard disk, keyboard, and input/output interfaces. Workstation 58 preferably includes a standard Java-enabled Web browser 60, such Sun Microsystems' HotJava®, Netscape's Navigator® or Microsoft's Internet Explorer®.

In a most preferred embodiment, workstation 58 also includes software comprising a Java Virtual Machine platform, which may be embedded in software associated with Web browser 60 or which may be separately installed in permanent memory of workstation 58. The Java Virtual Machine enables workstation 58 to execute programs written in the Java™ computer language ("Java") and advantageously serves as a consistent platform across different kinds of computers and operating systems, thus allowing the same Java application to run within browsers on PC, Macintosh, and UNIX® workstations, etc. The Java Virtual Machine platform translates the Java-based applets and applications to bytecodes which are understood by the underlying operating system of workstation 58.

While the specific use of Java and the Java Virtual Machine platform is described herein, it will be recognized by one of ordinary skill in the art that any object-oriented language (e.g., C++) and appropriate language interpreter (e.g., a just-in-time compiler) may be used in the methods and systems of the present invention.

Still referring to drawing FIG. 2, a preferred method of interaction between printing device 30 and workstation 58 is now described. In a preferred embodiment of the invention, a user on workstation 58 desiring to access, control, and/or manage print jobs stored in job retention of printing device 30 submits a URL address associated with embedded Web server 32 to the Web browser 60 of workstation 58. The URL address may be supplied by the user in a variety of ways, to include direct keyboard entry of the address, selection of a previously stored "bookmarked" address, or "clicking" on an appropriate hypertext link appearing on a Web browser control bar or on a Web page displayed by Web browser 60. Using the URL, Web browser 60 sends a command in the form of a retrieval request to embedded Web server 32 over network as identified in the URL address. The retrieval request is processed by microprocessor 40, which causes embedded Web server 32 to transmit a Web page 34 back over communication link 38 to Web browser 60.

As previously discussed, Web page 34 contains an embedded <APPLET> tag associated with at least one interactive Java application configured for accessing and managing print jobs stored in job retention 45 of printing device 30. Preferably, the <APPLET> tag references a source file for the at least one interactive Java application stored in memory 42 of printing device 30. Web browser 60 downloads and displays the requested Web page 34 and requests the source file of the at least one interactive Java application from Web server 32 via communication link 38. Web server 32 processes the request, retrieves the at least one interactive Java application from memory 42, and transmits the at least one interactive Java application to Web browser 60, where it is downloaded and then executed by a Java Virtual Machine platform residing on workstation 58, or embedded within the Web browser 60 software. At a minimum, the Java Virtual Machine platform comprises at least a Java-enabled browser, a Java compiler to turn Java source code into Java byte code, and a Java interpreter to run Java programs. Upon closing a session with the at least one interactive Java application, the downloaded Java application is preferably configured to be automatically removed from RAM memory of workstation 58 so as to free up resources for other applications.

Upon downloading Web page 34 and executing the associated at least one interactive Java application, the at least one interactive Java application operates independently of Web page 34 to create and display at least one interactive window 62 on workstation 58. The at least one interactive window 62 includes graphical user interface control panel options, menus, and/or links for accessing and managing print jobs found in job retention 45 of printing device 30. The at least one interactive Java application further creates at least one thread to run embedded Web server 32 of printing device 30.

In a preferred embodiment, the at least one interactive Java application is associated with a Java console. As used herein, a Java console comprises application software which is configured to allow a user to provide a single point of control for the various aspects of one or more Java applets which are running on, and/or which have been downloaded by, workstation 58. For example, the at least one interactive Java application may comprise a plurality of Java applets, with each applet programmed to perform various functions (e.g., retrieve data objects) related to printer management and/or access to print jobs stored in job retention 45. The Java console may be stored as an application in memory of workstation 58, or may be configured as a portion of the at least one interactive Java application. When the Java console is stored on workstation 58, an <APPLET> tag embedded on Web page 34 references a source file for downloading the Java console from its stored location within workstation 58 or printing device 30.

Figure 3:
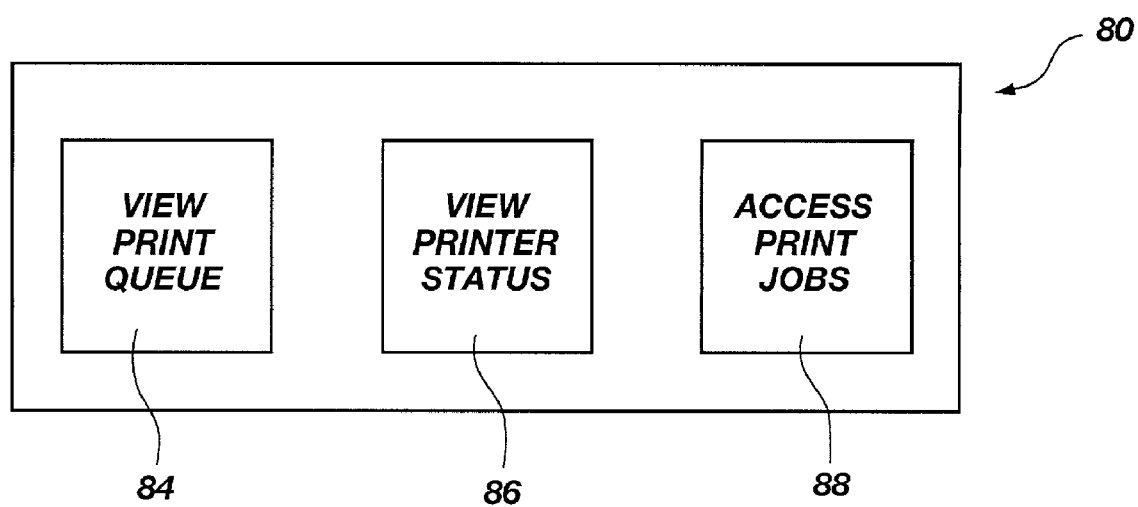
FIGS. 3 through 7 are embodiments of interactive menus of the present invention.

In a preferred embodiment shown in drawing FIG. 3, and with further reference to drawing FIGS. 1 and 2, the at least one Java application creates and displays a graphical user interface on workstation 58 (FIG. 2) which is configured as a "top level control panel" 80 for accessing and managing print jobs stored in job retention 45 of printing device 30 (FIG. 1). For illustrative purposes only, the top level control panel 80 may be initially configured, for example, as an interactive window (e.g., a graphical user interface) which provides a user with several menu "buttons" 84, 86, 88 representing various options a user may take in regard to accessing, controlling and managing print jobs stored on printing device 30.

Top level control panel 80, and the various other "control panels" and/or windows disclosed herein, may be written in Java and/or HTML, dependent upon the particular functional aspect of the control panel. One of skill in the art would recognize the numerous possibilities of implementing top level control panel 80 and the other control panels of the invention. Thus, the following examples are intended to be illustrative only, and in no way limiting of the present invention.

As shown in drawing FIG. 3, top level menu 80 includes a selectable control button 84 labeled "View Print Queue," a selectable control button 86 labeled "View Printer Status," and a selectable control button 88 labeled "Access Print Jobs." By clicking on or otherwise activating one of the control buttons, an interactive window is opened as a graphical user interface which allows the user a plurality of access, control, and management functions related to the respective depicted functionalities of the buttons 84, 86, 88. Preferably, but not necessarily, each of the control and access functionalities represented by buttons 84, 86, 88 are supported by programing from an individual, multi-threaded Java applet. The Java applets providing the desired functionality may be automatically extracted from printing device 30 or workstation 58 in the manner previously discussed, for example, upon a user "clicking" for a desired function. Alternatively, the source files for some, most or all of the Java applets may be automatically downloaded when the user opens Web page 34 upon initial interaction with embedded Web server 32. As previously discussed, the interaction and display of the applets is preferably managed by a Java console.

As one example of a top level control panel 80 hierarchical configuration, the "View Print Queue" button 84 may, for example, lead to a graphical user interface screen allowing the user various control options for instantly viewing all pending and/or stored print jobs in job retention 45 of printing device 30. Thus, by "clicking" on button 84, the print jobs and other associated information, such as document name, status, owner, progress, and time sent, may be accessed and the information is displayed in a "view print queue" pop-up window 90 on a display portion of workstation 58 (drawing FIG. 4). These print jobs may be initially displayed as an inventory or list 94, for example, in a "first in, first out" basis as a default setting. Using a mouse and/or keyboard entry, a user may scroll through the displayed list of print jobs.

Figure 4:
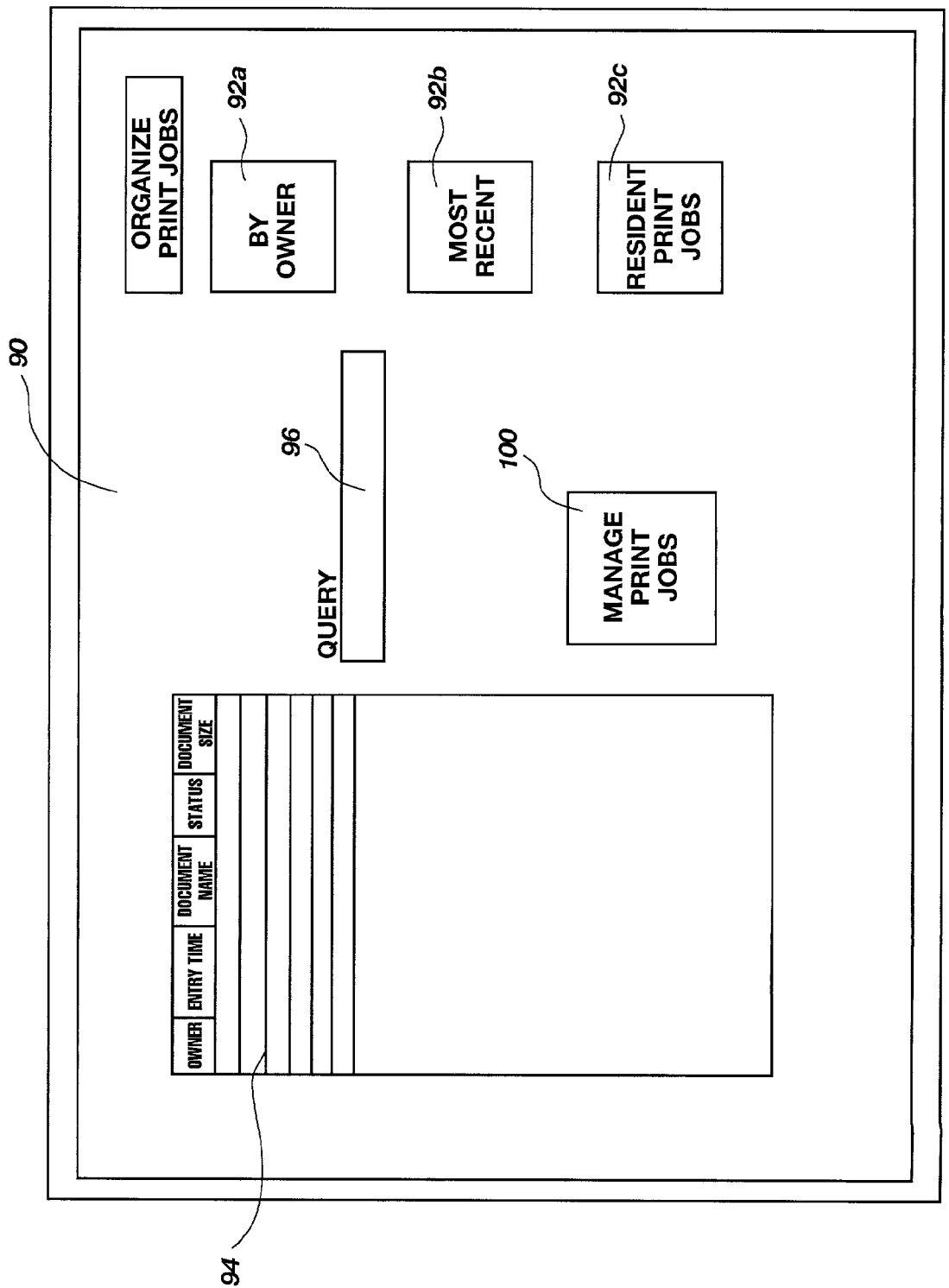

Referring to drawing FIG. 4, a user on workstation 58 (FIG. 2) may be able to use a function associated with "View Print Queue" button 84 to access, display, and peruse lists 94 of print jobs arranged in various categories, such as by "owner" (e.g., a list of print jobs sent by each user over a predetermined time period), "most recent" (e.g., a list of a predetermined number of all print jobs pending or recently printed), "resident" print jobs (i.e., print jobs which have been stored on a semipermanent basis in job retention 45 (FIG. 1) for recurrent printing, such as business forms), and the like. The print jobs located within these categories may be further arranged according to various hierarchical or subclassification systems as would be apparent to one skilled in the art. A historical list of print jobs retained by printing device 30 may also be accessed and displayed. Access to these categories may be attained by clicking on a "folder" 92a, 92b, 92c, or other icon earmarked for the particular category, or by clicking on a file location from a drop-down menu (not shown) associated with the view print queue pop-up window 90.

In each of these examples, at least one Java applet associated with the at least one Java application downloaded by Web browser 60 of workstation 58 directs microprocessor 40 of embedded Web server 32 of printing device 30 to access the requested data and provide it to the at least one Java application. The at least one Java applet then provides the data to the Java Virtual Machine located on workstation 58, whereupon the requested data is translated and then displayed through Web browser 60 (see drawing FIG. 2).

In an additional aspect of the embodiment, the "view print queue" pop-up window 90 may provide a Common Gateway Interface (CGI) script and associated data entry fields 96 for searching for a particular print job in job retention 45, and/or for searching for a particular print job otherwise located within a particular data list 94. Data entry fields 96 may specify or otherwise include search parameters including: date and time sent, document owner, date originated, document size (e.g., number of bytes, words, pages, etc.), and the like. One of skill in the art will recognize that advanced searching capabilities may also be added, such as searching for key words captured by suitable software, for example, from a heading or title of a document sent to job retention 45. Additionally, searches may be conducted by searching for descriptive "key" words which are entered by a user and associated with a particular document, upon submission of the document for printing.

Upon viewing the desired list 94 and format used for displaying the stored print jobs, a user may select one or more print jobs to manage by, for example, clicking on a print management button or icon 100 appearing adjacent the displayed list labeled "Manage Print Jobs" (drawing FIG. 4). Upon clicking the subject button, a responsive Java applet causes a pop-up window to appear, the pop-up window comprising a graphical user interface representing a print management control panel 102 (drawing FIG. 5). Preferably, the print management control panel 102 will be an enhanced version of the graphical user interface displayed on the printing device 30. In another aspect of the embodiment, print management control panel 102 may have the same, or a substantially similar, appearance as the control panel used by the application software which sent the particular print job. Preferably, a single multi-threaded Java applet provides the desired print management functionality discussed below.

Of course, a control button allowing a user to "Manage Print Jobs" may also or alternatively appear on other windows, menus, graphical user interfaces, etc., associated with the invention. In a preferred alternate embodiment of the invention, a control button for the management of print jobs is displayed on the first window Java window which is viewable by the user upon downloading Web page 34.

Figure 5:
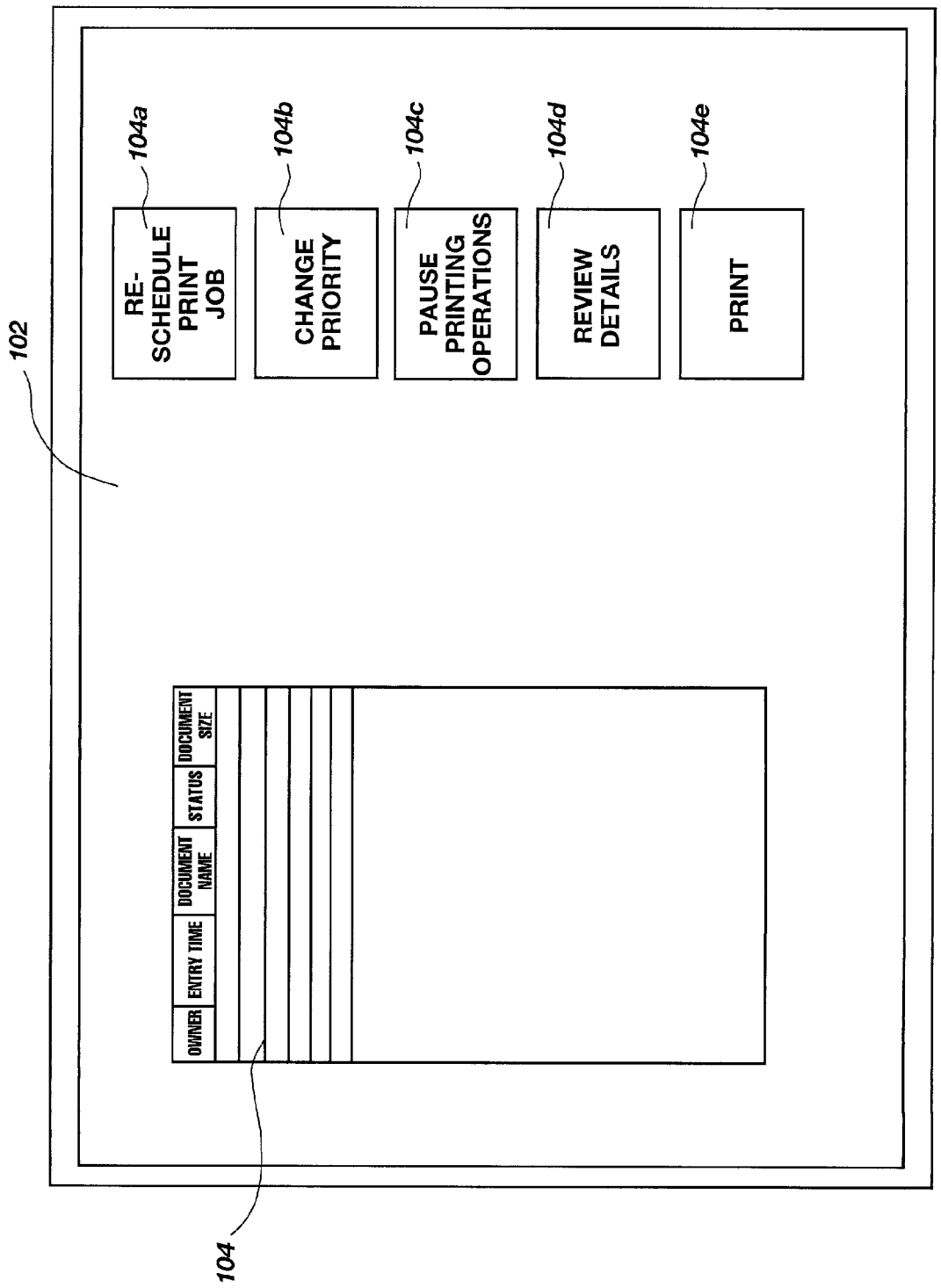

Still referring to drawing FIG. 5, clicking on print management button 100 preferably automatically triggers a functionality in print management control panel 102 allowing the management of all print jobs in job retention 45 as a default position. Alternatively or in addition, individual or groups of print jobs to be managed can be earmarked for management by highlighting the subject jobs by clicking on them. In this regard, a scrollable list 104 of all print jobs in job retention 45 will preferably appear in a section of print management control panel 102.

Print management control panel 102 preferably provides a plurality of device options related to the various print functions of printing device 30. By clicking on various device options, a user may change various printing device 30 settings associated with the documents stored in job retention 45. For example, the user may be provided with assorted selectable print function control buttons 104a-d, the control buttons representing applet functionalities configured to allow the user to: reschedule the printing of a document for a specified time, promote or demote the priority of documents within the queue, set printer priorities for documents sent by specified users, pause printing operations, review details regarding pending print jobs (e.g., number of pages to be printed, document size, paper source, paper color etc.), and the like. Once a desired print job in scrollable list 104 has been earmarked for management, the print job can be managed by pressing a button with the desired functionality, thus allowing, for example, various manipulations of the information contained in scrollable list 104. The print jobs may also be printed at any time by, for example, selecting the job name on the scrollable list 104, and then selecting a print function button 104e provided by the print management control panel 102.

In another aspect of the embodiment, a user may utilize the provided control panel 102 to reroute or redistribute stored or pending print jobs to one or more other networked printers, for example, in an effort to optimize available printer resources. The print management control panel 102 may also provide the functionality to use microprocessor 40 of printing device 30 (or the microprocessor of workstation 58) to copy user-selected raster images stored in job retention 45, and then send those images to one or more other networked printers for printing. Print management control panel 102 may also provide Java-enabled functionality for storing copies of selected print jobs on a file server, CD-rom, or other storage device external to printing device 30. In the situation where printing device 30 has been configured with an SMTP client, rasterized images may also be e-mailed to networked workstations or other Web-enabled devices upon the specification of an e-mail address, for example, in data field of a CGI script. Functionality can also be provided by an applet to keep sensitive print jobs private and free from manipulation, for example, by requiring the entry of a user PIN code entered on print management control panel 102.

Figure 6:
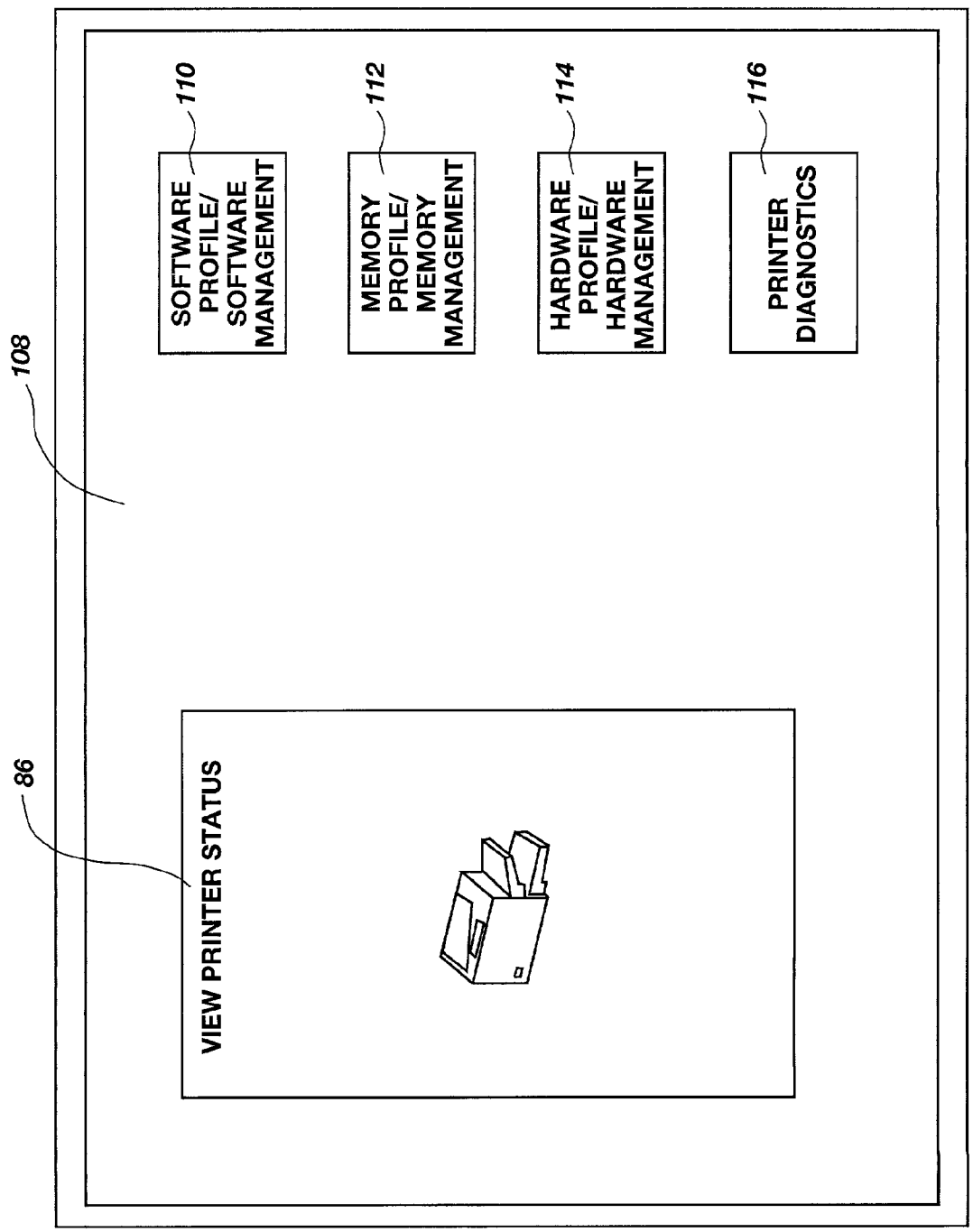

Referring to drawing FIGS. 3 and 6, clicking on button 86 labeled "View Printer Status" will display an interactive pop-up window comprising a graphical user interface printer status control panel 108 providing access to information related to the operation of job retention 45 and other aspects of printing device 30. Upon appropriate commands, such as by clicking on a drop-down menu, icons, or buttons, various printer data may be displayed, including, for example, performance information (such as RAM, percent memory utilized and available in job retention 45), software versions utilized by printing device 30 to effect printer operations (e.g., raster operations), status of various printing hardware and accessories (e.g., information regarding device management and configuration), paper and toner availability, number of users linked to printing device 30 and their network address, recent error messages and diagnostics, etc. Using control buttons or menu options provided within printer status control panel 108, a user may, for example, point and click to optimize the configuration of printing device (e.g., reallocate memory resources and change printer speed, network settings, resolution (e.g., dots per inch), paper handling options, paper size, power saver settings, etc.), analyze software and hardware glitches, download updated software to printing device 30, connect and disconnect networked users, and the like. Illustrated in drawing FIG. 6 are exemplary buttons 110-116 labeled in accordance with their above-described functionalities. Button 110 is labeled "software profile/software management", button 112 is labeled "memory profile/memory management", button 114 is labeled "hardware profile/hardware management", and button 116 is labeled "printer diagnostics."

A separate multi-threaded Java applet is preferably provided for each major functionality represented by each of buttons 110-116. In general, the Java applets, which may be controlled by the Java console, direct microprocessor 40 of embedded Web server 32 of printing device 30 to access and transmit the requested data, as well as to perform the configuration, diagnostic, downloading operations (see also drawing FIG. 2). The requested data is then provided to the applets, which submit the data back to workstation 58 through the communication window provided by embedded Web server 32. At workstation 58, the data is translated and displayed in Web browser 60 by the Java Virtual Machine.

Figure 7:
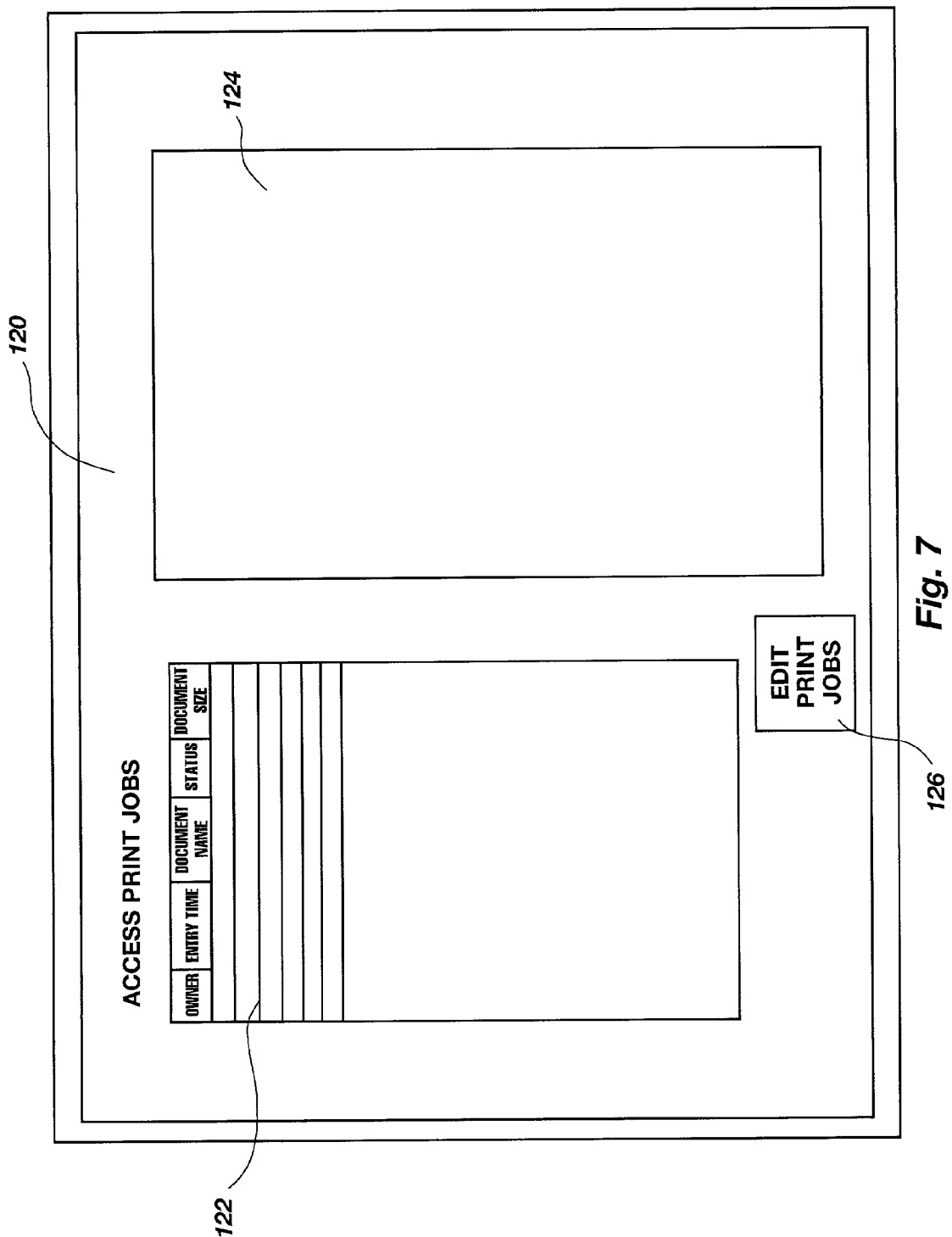

With reference to drawing FIGS. 3 and 7, clicking on control button 88 labeled "Access Print Jobs" leads to a user being provided a rasterized "bitmap" or digital image of a desired print job. Initially, clicking on control button 88 causes one or more extracted Java applets to provide a pop-up graphical user interface window configured as an "Access Print Jobs" control panel 120. In a preferred aspect of the embodiment, clicking on control button 88 causes at least one Java applet to initially provide the user with a displayed list 122 of all print jobs stored in job retention 45, with the displayed list 122 provided in a "queue-like" format. The queue-like format may comprise various data which identifies the print jobs in terms of, for example, date and time sent, document owner, date originated, document size, and the like. It will thus be readily apparent to one of skill in the art that the following functions of control button 88 may also be provided as an option for users who have clicked on the "View Print Queue" button 84 as shown in drawing FIGS. 3 and 4, and/or that the print jobs on the displayed list 122 may be categorized or organized in the manner previously described. Using displayed list 122, the user may then select a print job for viewing.

In a further aspect of the embodiment, selection of a print job for viewing from displayed list 122 may occur, for example, by clicking on the print job identifying data in displayed list 122, or by clicking on an icon or link referencing a particular print job image. Requesting the display of a particular print job causes a threaded Java applet to request microprocessor 40 of embedded Web server 32 of printing device 30 to locate the directory address of the stored print job in job retention 45. Microprocessor 40 then accesses, extracts, and provides the stored, rasterized image of the selected print job to the Java applet, which functions as a file viewer through Web browser 60 of workstation 58. Preferably, the bitmap image of the print job may be displayed as one or more "web pages" on Web server 32. Also preferably, the Java applet may provide the bitmap image in a sizable "image window" 124, which "pops up" within an area of control panel 120. In this regard, the user may scroll through each page of the print job, for example, by clicking on an appropriate control function located within window 124, such as a "next page" icon, or a "next page" command provided by a drop-down window, or by using designated keyboard controls. Alternatively, a separate sizable window 124 may appear for each page of the requested print job. By "sizable window" it is meant a window interoperating within Web browser 60 that may be adjusted upwardly and/or downwardly in viewable size.

The Java applet thus provides a bit-map image of the requested print job to Web browser 60, whereupon the bit-map image may be viewed by the user as a displayable window on workstation 58. Advantageously, the Java applet functioning as a file viewer allows the user on workstation 58 to view the rasterized image of the print job without downloading it.

In an alternate aspect of the embodiment, bit-map images of portions of the text or graphics of print jobs stored within job retention 45 may optionally be displayed along with the printing data of each print job in displayed list 122. The bit-map images of portions of the text or graphics are provided in a manner in which the images can be visually associated with each print job, which may entail locating the bit-map image adjacent to the data identifying each job provided in the "queue-like" format of displayed list 122. A clickable "link" to the bit-map images of portions of the text or graphics may alternatively be provided.

As a second alternate embodiment, the bit-map images of the print jobs in job retention 45 may be provided by the Java applet(s) to Web browser 60 for downloading and viewing by the user on workstation 58.

A user may also be provided with the opportunity to manipulate the print attributes and/or text or images of the stored print job. In this embodiment of the invention, a user may select a print job for "editing" by clicking on an "Edit Print Jobs" button 126, for example, after clicking to highlight a particular print job in displayed list 122. Upon selecting the "Edit Print Jobs" button 126, a Java applet requests microprocessor 40 of Web server 32 to translate the rasterized print job back into the format in which the print job was originally received by printing device 30 (e.g., Page Description Language (PDL) (see drawing FIG. 2). The PDL language may then be converted into the appropriate text, graphics and print attributes by microprocessor 40. In a less preferred embodiment, the data packet representing the desired print job is sent to the microprocessor of workstation 58 for the translation process. Upon translation in either event, the Java applet makes the file available to workstation 58 for editing of text and/or graphics and/or reassignment of print attributes. In a further aspect of the embodiment, translation of the desired print job triggers the Java applet to cause workstation 58 to open the software application which created the print job, or a software application compatible with the application that created the job, whereupon the print job is displayed and available for editing. Upon editing, the print job may be sent back to printing device 30 by an applet or appropriate printer drivers in workstation 58. Once the print job has been RIP'ed (i.e., turned into a raster image) by microprocessor 40, the edited print job can be stored in job retention 45 at the same or a different address in the printer memory 42.

The present invention thus advantageously provides methods and systems of locating, viewing, controlling and manipulating printing information stored in job retention of a printing device. Use of the present invention is particularly advantageous for accessing and manipulating print jobs which are stored permanently in printer memory for frequent, on-demand printing. Further advantageously, the present invention allows an individual to view, optimize and prioritize the print jobs in job retention from a location which is remote from the printing device, and wherein the location may include any workstation with access to the internet. As such, the present invention is particularly suited for use by an office or network manager. In this regard, the top level screen 80 shown in drawing FIG. 3 is preferably provided with a user login screen by a Java applet adapted for that purpose. Upon user authentication, the various control buttons of the present invention are activated.

It will be appreciated by those skilled in the art that the embodiments herein described while illustrating certain embodiments are not intended to so limit the invention or the scope of the appended claims. Those skilled in the art will also understand that various combinations or modifications of the preferred embodiments could be made without departing from the scope of the invention.

For example, it is understood that while the methods and apparatus of the present invention have been described in relation to a workstation interacting with a printing device, one of skill in the art will recognize that the present invention may be utilized with a wide variety of networked and/or Web-based devices. Furthermore, while Java and C++ have been specifically mentioned for use in the present invention, the applets of the present invention may be implemented in various other programming languages, such as PERL, Cobol, Smalltalk, C, and the like. Additionally, some or all of the applets used in the present invention can reside on a networked server in byte-code form, which can be readily downloaded to and executed on any Java virtual machine.

Thus, while certain representative embodiments and details have been shown for purposes of illustrating the invention, it will be apparent to those skilled in the art that various changes in the invention disclosed herein may be made without departing from the scope of the invention, which is defined in the appended claims.

What is claimed is:

1. A method of managing stored print jobs of a printing device, said method comprising:
   providing a web server inside said printing device, said web server linked to a network;
   initiating a remote request over said network for a web page from said web server, said web page having at least one applet tag referencing at least one applet thereby;
   transmitting said web page over said network;
   downloading and displaying said web page using a web browser;
   downloading said at least one applet using said web browser in response to downloading said web page, said at least one applet programmed for providing control over data stored in job retention memory of said printing device, said at least one applet providing a printer control panel operable to show rasterized images of said data, said at least one applet further providing key word search ability via said printer control panel of text within a print job; and
   managing said data stored in job retention memory using said at least one applet operating within said web browser, managing said data comprising translating said data from rasterized images into a format compatible with a software application used to create said data.

2. The method according to claim 1, further comprising requesting said at least one applet to retrieve a portion of said data from said job retention memory.

3. The method according to claim 1, further comprising providing a workstation configured with said web browser.

4. The method according to claim 1, further comprising executing said at least one applet using a Java Virtual Machine platform on a workstation.

5. The method according to claim 1, wherein said web browser comprises a java-enabled web browser.

6. The method according to claim 1, wherein managing said data comprises viewing rasterized images of stored print jobs.

7. The method according to claim 6, wherein said at least one applet functions as a file viewer.

8. The method according to claim 1, wherein managing said data includes displaying a list of print jobs stored in said job retention memory.

9. The method according to claim 8, wherein managing said stored data comprises at least one of printing, removing, or changing the priority of at least one print job in said list of print jobs.

10. The method according to claim 8, wherein managing said stored data comprises rescheduling at least one print job in said list of print jobs.

11. The method according to claim 1, wherein managing said stored data comprises categorizing said data into user selected categories.

12. The method according to claim 1, wherein managing said stored data comprises creating copies of portions of said data.

13. The method according to claim 1, wherein managing said stored data comprises converting portions of said data into a printer control language.

14. A system for managing stored print jobs of a printing device, said system comprising:
- a web server incorporated within said printing device, said web server linked to a network, said printing device comprising a job retention memory for storing print jobs sent by network-based devices;
- at least one workstation for communicating with said network, said at least one workstation having a web browser thereon; and
- at least one applet accessible by said at least one workstation, said at least one applet for managing stored data in said job retention memory of said printing device through user input on said at least one workstation, managing said data comprising transforming said data from rasterized images into a format in which said data was originally received by said printing device, said at least one applet able to provide a printer control panel operable to provide rasterized images of said data, said at least one applet further able to provide key word search ability utilizing said printer control panel of text within a print job.

15. The system according to claim 14, wherein said web browser comprises a java-enabled web browser.

16. The system according to claim 14, further comprising a Java Virtual Machine platform provided on said at least one workstation.

17. The system according to claim 14, wherein said at least one applet is threaded to operate said web server.

18. The system according to claim 14, further comprising a Java console accessible by said at least one workstation.

19. A method of managing print jobs stored in job retention memory of a printing device, said method comprising:
- providing said printing device internally incorporating a web server, said web server linked to a network;
- providing a workstation, said workstation in communication with said network and configured with a java-enabled web browser and a Java Virtual Machine platform;
- initiating a request over said network for a web page from said web server using said java-enabled web browser, said request initiated by specifying a network address of said web page to said java-enabled web browser, said web page having at least one applet tag referencing at least one applet responsive to said request, transmitting said web page over said network to said java-enabled web browser;
- downloading and displaying said web page using said java-enabled web browser;
- downloading said at least one applet using said java-enabled web browser in response to downloading said web page, said at least one applet programmed to provide control over data stored in job retention memory of said printing device, said at least one applet programmed to provide a printer control panel operable for viewing rasterized images of said data, said at least one applet further programmed to provide key word search ability via said printer control panel of text within a print job;
- executing said at least one applet using said Java Virtual Machine platform; and
- managing said data stored in job retention memory using said at least one applet operating within said web browser, managing said data comprising translating said data from a RIP'ed format into a format compatible with a software application used to create said data.

20. A method of managing stored print jobs, said method comprising:
- providing a web server within a printing device, said web server linked to a network;
- initiating a remote request over said network for a web page from said web server within said printing device, said web page having at least one applet tag referencing at least one applet;
- transmitting said web page over said network;
- displaying said web page using a web browser;
- downloading said at least one applet in response to downloading said web page, said at least one applet programmed for providing control over data stored in job retention memory of said printing device, said at least one applet programmed for providing a printer control panel operable to show rasterized images of said data, said at least one applet further programmed for providing key word search ability using said printer control panel of text within a print job; and
- managing said data stored in said job retention memory using said at least one applet, managing said data comprising translating said data from a RIP'ed format into a format compatible with a software application used to create said data.

* * * * *

UNITED STATES PATENT AND TRADEMARK OFFICE
CERTIFICATE OF CORRECTION

PATENT NO. : 7,239,409 B2 Page 1 of 1
APPLICATION NO. : 09/887618
DATED : July 3, 2007
INVENTOR(S) : Travis J. Parry It is certified that error appears in the above-identified patent and that said Letters Patent is hereby corrected as shown below:

On the Title page, in field (57), under "Abstract", in column 2, line 11, insert -- as a -- before "file".

Signed and Sealed this

Eighteenth Day of August, 2009

David J. Kappos
*Director of the United States Patent and Trademark Office*